United States Patent [19]

Nilsen

[11] 4,274,457
[45] Jun. 23, 1981

[54] TREE SHEAR BLADE STRUCTURE

[76] Inventor: Christopher Nilsen, 1101 W. Birch St., Shelton, Wash. 98584

[21] Appl. No.: 103,397

[22] Filed: Dec. 13, 1979

[51] Int. Cl.³ .............................................. A01G 23/08
[52] U.S. Cl. ................................... 144/34 E; 83/694; 144/3 D
[58] Field of Search ................. 83/694, 698; 144/3 D, 144/34 E, 34 R, 309 AC, 241, 323

[56] References Cited

U.S. PATENT DOCUMENTS

| 3,527,272 | 9/1970 | Hamilton | 144/34 E |
| 3,540,501 | 11/1970 | Jonsson | 144/34 E |
| 3,640,322 | 2/1972 | Allen | 144/34 E |
| 3,996,982 | 12/1976 | Oldenburg | 144/3 D |
| 3,999,582 | 12/1976 | Allen et al. | 144/34 E |
| 4,147,191 | 4/1979 | Giese | 144/3 D |
| 4,210,183 | 7/1980 | Nilsen | 144/34 E |

FOREIGN PATENT DOCUMENTS 1065742  6/1979  Canada .................................. 144/34 E Primary Examiner—W. D. Bray
Attorney, Agent, or Firm—Robert W. Beach; Ward Brown

[57] ABSTRACT

Bolts detachably mount a thin tree-shearing blade on a peripheral reinforcing blade carrier swingably mounted on a tractor. The plunger of a hydraulic jack is connected directly to the blade, independently of the blade carrier, for swinging the blade to shear a tree. The force applied by the jack to the blade is applied in the plane of the blade. To prevent excess stress from being applied to the bolts connecting the blade and the blade carrier as a tree is sheared, the blade carrier includes projecting backing plates fitted against opposite edges of the blade for transmitting force applied to the blade directly to the blade carrier.

17 Claims, 5 Drawing Figures

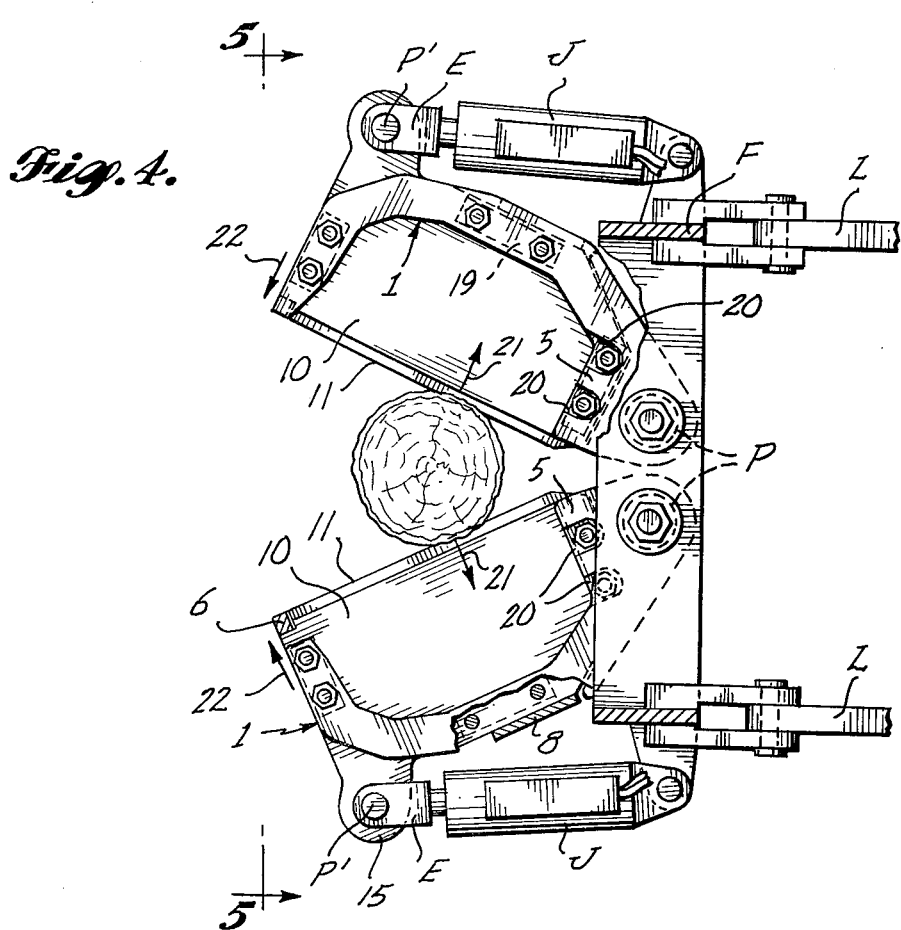
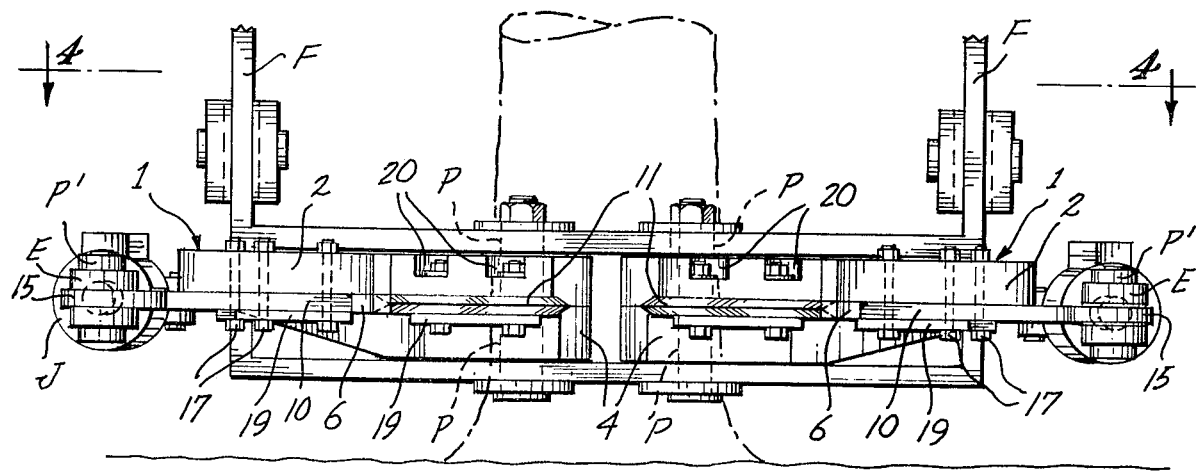

TREE SHEAR BLADE STRUCTURE

BACKGROUND OF THE INVENTION

1. Field of the Invention

The present invention relates to mobile tree shears of the type using blades for shearing trees and, more specifically, to novel blade structure for such tree shears.

2. Prior Art

Tree shears are known having opposed swinging blades power driven toward each other for shearing a standing tree. Some known tree shears use wedge-shaped blades increasing in thickness in the direction away from their cutting edges, but, as noted in Allen U.S. Pat. No. 3,640,322, preferably thin flat blades of uniform thickness are used so that less power is required to slice through the tree.

Thin flat blades of uniform thickness require reinforcement so that the blades will withstand the force required to shear a tree without bending or breaking. Such reinforcement usually is a thick rib or plate formed on or secured to the margin of a blade remote from its cutting edge so that the rib or plate will not contact a tree being sheared. For example, in some known blades a peripheral reinforcing rib is cast integral with the blade, or a reinforcing plate is welded to the blade. A problem with this type of blade structure is that the entire blade unit must be scrapped if the thin tree-shearing portion of the blade becomes worn beyond repair.

In some known tree shears, thin flat blades of uniform thickness are detachably mounted on separate peripheral reinforcing members or "blade carriers", such as by bolts, so that a blade can be replaced without scrapping the associated blade carrier. For example, in one known tree shear, a thin flat blade is bolted onto the bottom surface of a blade carrier which, in turn, is pivotally mounted on suitable support structure carried by a tractor. A problem with this type of blade structure is that blade-driving force is applied to the blade carrier and transmitted to the blade only by the connecting bolts. Such force can be great enough to shear the bolts and thereby detach the blade from the blade carrier.

Hamilton U.S. Pat. No. 3,527,272 discloses tree shear blade structure including a semicircular blade or "knife" having a straight cutting edge and detachably mounted on a "knife holder" by "studs". About one-half of the arcuate blunt edge portion of the blade is received in an arcuate groove in the holder. A problem with the Hamilton blade structure is that blade-swinging force is applied to the holder rather than directly to the blade and cutting reaction force applied to the blade at any point along its cutting edge other than precisely at the center of the cutting edge tends to slide and rotate the blade relative to the holder. Such sliding rotation is resisted only by the studs. Consequently, as in the blade structure discussed above, in the Hamilton blade structure substantial force is transmitted between the blade and the blade holder only by the studs connecting the blade to the blade holder.

Another problem with known tree shears using a blade detachably mounted on a blade carrier is that the blade-swinging power drive mechanism applies force offset from the plane of the blade. For example, in the known tree shear having a thin flat blade bolted to the bottom of a blade carrier, the power drive mechanism is in the form of a hydraulic jack having its plunger connected to the blade carrier above the blade. Force applied to the blade carrier by the jack is applied in a plane parallel to but above the plane of the blade, and it is in the lower plane of the blade where such force is applied to a tree by the cutting edge of the blade. A substantial moment tending to twist the blade carrier results, increasing the stress on the pivotal mounting for the blade carrier and increasing the stress on the bolts connecting the blade to the blade carrier. This also is a problem with the "Means for Cutting Trees" of Jonsson U.S. Pat. No. 3,540,501 in which a cupped blade is bolted to the underside of a blade carrier and blade-swinging force is applied to the blade carrier above the blade.

SUMMARY OF THE INVENTION

It is an object of the present invention to provide novel blade structure for a tree shear of the type having a swinging blade and utilizing a thin flat blade detachably mounted on a separate reinforcing blade carrier by pins.

It also is an object to provide such blade structure in which force applied to the blade during a tree-shearing operation is transmitted to the blade carrier at least partially other than by the pins attaching the blade to the blade carrier.

Another object is to provide such blade structure in which force applied to the blade for swinging it to shear a tree is applied only to the blade and in the plane of the blade.

A further object is to provide such blade structure formed of component parts which may be utilized for forming either blade of a tree shear having opposed swinging blades.

An additional object is to provide such blade structure in, so far as possible, light, compact and uncomplicated form.

Some of the foregoing objects can be accomplished by providing blade structure for a tree shear of the type having a swingable power-driven tree-shearing blade, such blade structure including a pivotally mounted blade carrier and a thin flat blade boltable to the blade carrier and connectible directly to the tree shear power drive mechanism independently of the blade carrier. Others of such objects can be accomplished by forming the blade carrier with backing plates abuttable by the cutting edge of the blade and generally the opposite edge of the blade for direct transmission of force applied to the blade to the blade carrier.

DESCRIPTION OF THE DRAWINGS

FIG. 4 is a somewhat diagrammatic fragmentary top plan of blade structure in accordance with the present invention mounted on a tree shear, at the beginning of a tree-shearing operation, and FIG. 5 is a somewhat diagrammatic fragmentary front elevation of blade structure in accordance with the present invention mounted on a tree shear, at the beginning of a tree-shearing operation.

INCORPORATION BY REFERENCE

Incorporated by reference herein is my U.S. patent application Ser. No. 962,377, filed Nov. 20, 1978, for Tree Clamp and Shear Support Structure, now U.S. Pat. No. 4,210,183. While the present invention relates to novel blade structure which preferably is used with such support structure, and, accordingly, is described with reference to such support structure, the novel features of the blade structure of the present invention also could be incorporated into any other type of tree shear having a power-driven tree-shearing blade.

DETAILED DESCRIPTION

Figure 1:
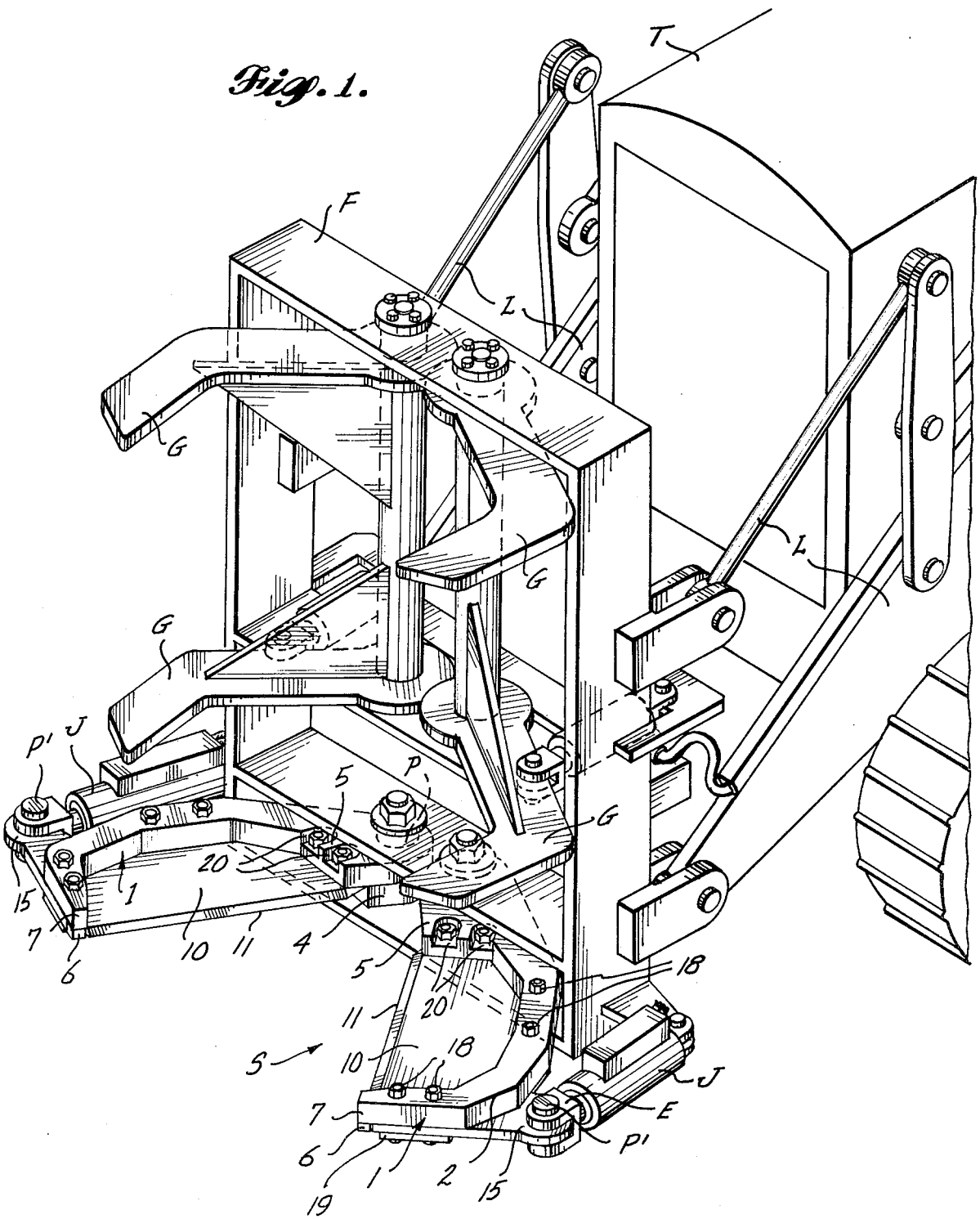
FIG. 1 is a fragmentary top perspective of a mobile tree shear having blade structure in accordance with the present invention.

As shown in FIG. 1, blade structure in accordance with the present invention can be used in a tree shear of the type including a box frame F pivotally carried by the conventional linkage L of a tractor T. Such tree shear can include opposing sets of elevationally spaced, hooked grapple arms G pivotally mounted between the upper two cross members of frame F between its upright side members and above tree-severing mechanism S in the form of coplanar opposed tree-shearing blades. Each blade is swingably mounted between the lower two cross members of the box frame by a pivot pin P and is swingable toward and away from the other blade by power drive mechanism in the form of a hydraulic jack J having its cylinder connected to the box frame and its reciprocating plunger connected to the outer end portion of the blade.

In use, the tractor is maneuvered to position a standing tree generally centrally between the grapple arms and blades, the grapple arms are closed to securely clamp the tree and the blades are closed to sever the tree. The clamped and severed tree then is maneuvered in upright position to a piling or yarding area, whereupon the tractor linkage is manipulated to tilt the box frame forward to swing the tree forward and downward. The lowered tree can be skidded to position it as desired and then released.

Figure 2:
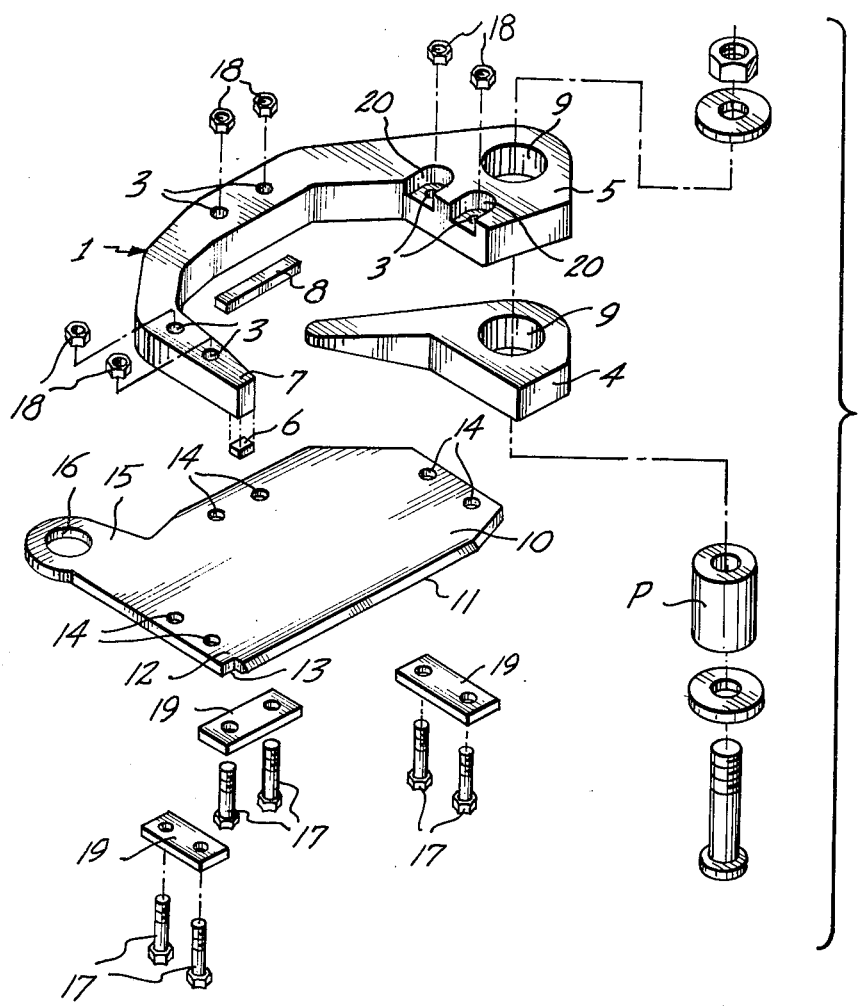
FIG. 2 is an exploded top perspective of the blade structure of FIG. 1.
Figure 3:
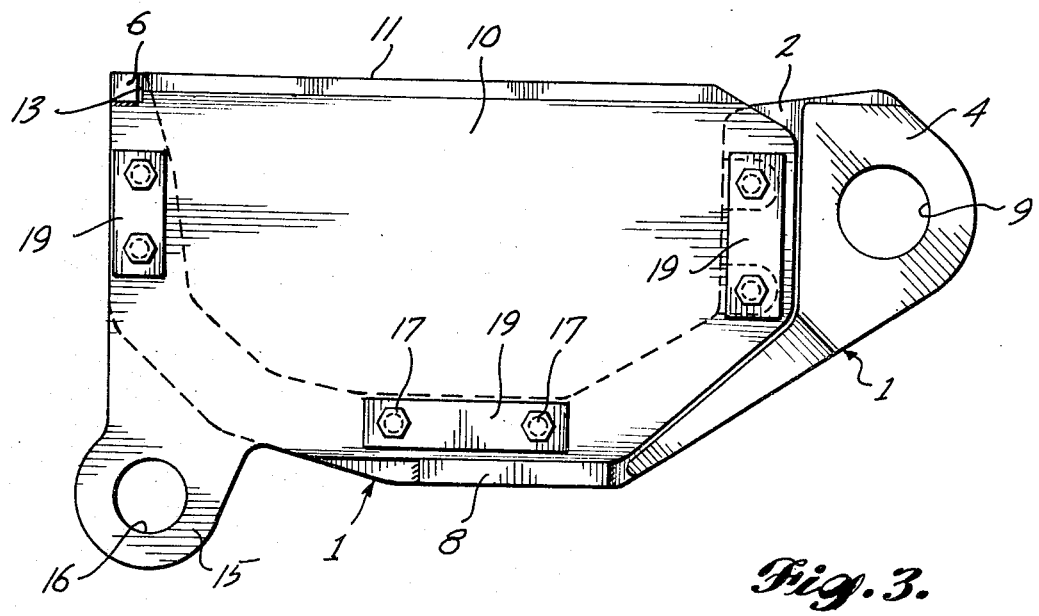
FIG. 3 is a bottom plan of such blade structure in assembled condition.

As best seen in FIGS. 2 and 3, the blade structure of the present invention includes a laminated blade carrier 1, the upper layer of which is a thick generally U-shaped blade-reinforcing body 2. Each of the three sides of the U-shaped body has a pair of bolt holes 3. The bottom layer of the laminated blade carrier is formed of three separate components—a thick pivot-reinforcing block 4 positioned at the inner end portion 5 of the U-shaped body 2, a small "applied force" force-transmitting backing plate 6 positioned at the outer end portion 7 of the U-shaped body and an elongated "reaction force" force-transmitting backing plate 8 positioned generally centrally between the ends of the U-shaped body—each rigidly and permanently attached to the underside of the U-shaped body such as by welding.

The inner end portion 5 of the blade carrier has a large through bore 9 extending through both the U-shaped body 2 and the pivot-reinforcing block 4 for receiving a pivot pin P by which the blade carrier is pivotally mounted on the lower cross members of frame F.

The blade structure of the present invention utilizes a thin, flat, generally rectangular blade 10 of uniform thickness except for the longitudinal cutting edge 11 being beveled along its major portion. The outer end portion 12 of the cutting edge of the blade has an unsharpened generally rectangular notch 13 of substantially the same size as the applied-force backing plate 6 of the blade carrier. Each of the other three edges of the generally rectangular blade has a pair of bolt holes 14 positioned to register with the corresponding holes 3 in the blade carrier.

The outer corner portion of the blade opposite the blade cutting edge is in the form of a projecting ear 15 for connection of the blade directly to the blade-swinging power drive mechanism independently of the blade carrier. For example, in the embodiment shown in the drawings, such ear has a hole 16 for receiving a pin P' connecting the forks of the clevis end E of the reciprocating plunger of jack J, as shown in FIG. 1. As shown in FIG. 5, the blade ear fits snugly between the clevis bifurcations to stiffen the blade ear.

The thin flat blade 10 is attached to the underside of the reinforcing body 2 of the laminated blade carrier 1 by three pairs of bolts and nuts 17 and 18, respectively. A single elongated washer plate 19 is provided for each pair of bolts. The washer plates act as ties between the bolts and provide further stiffening for the blade. Since, when mounted on frame F, the upper side of the inner end portion 5 of the blade carrier fits snugly against the underside of a cross member of the frame, notches 20 are formed in such upper side in the area of the bolt holes 3 in such end portion so that the nuts 18 are countersunk in the notches to avoid interference with swinging of the blade carrier.

In assembling the laminated blade carrier the last step is forming the countersunk notches 20, to enable each component of the blade carrier to be used either for the right or left blade of a tree shear having opposed coplanar blades. Similarly, the blades are reversible so that either blade is usable either on the right or left side.

As best seen in FIG. 3, with the blade bolted to the blade carrier, the reaction force backing plate 8 is in substantially contiguous engagement with a substantial portion of the straight blunt edge of the blade remote from the cutting edge 11. In addition, the blade carrier applied force backing plate 6 is received in the blade notch 13 which forms an unsharpened portion of the blade cutting edge abuttable with a side of the applied force backing plate. Preferably no portion of the applied force backing plate 6, or the outer end 7 of the blade carrier reinforcing body 2, projects a substantial distance beyond the cutting edge of the blade, but rather the a side of the applied force backing plate and the outer end of body 2 preferably are substantially in registration with the blade cutting edge.

In a tree-shearing operation, shown somewhat diagrammatically in FIGS. 4 and 5, swinging force is applied to the ear 15 of each blade by a jack J. As a tree is severed, reaction force applied to the blade at its area of engagement with the tree, represented by the arrows 21 in FIG. 4, is transmitted directly to the blade carrier because the edge of the blade remote from the cutting edge is in engagement with the reaction force backing plate 8.

Similarly, force applied to the blades by the jacks swings the outer end portions of the blades generally in the directions indicated by arrows 22 in FIG. 4. Such force is transmitted directly to the blade carriers because the unsharpened outer end portion of each blade cutting edge is in engagement with an applied force backing plate 6. This is particularly important when the blades are fully closed and the severed tree no longer applies reaction force to the blades. In this situation, the outer ends of the blade carriers abut and prevent further inward movement of the blade carriers. Without the applied force backing plates, substantially the full force applied directly to the blades tending to swing the blades inward would be applied as shearing stress on the bolts connecting the blades to the blade carriers.

The result of the direct transmission of the forces applied to the blades to the blade carriers through the backing plates is that little or no shearing force is applied to the shanks of pins or bolts 19.

In addition, as best seen in FIG. 5, connection of each blade-driving jack directly to its blade with the jack plunger moving in the plane of the blade results in all force being applied in the plane of the blade, instead of being offset from the plane of the blade so as to produce a blade-bending force couple. Consequently, there is no moment tending to twist the blade or the blade carrier as the tree is sheared.

A further advantage of the blade structure of the present invention is that the thick blade-reinforcing part of the blade carrier is positioned above the blade. The only components projecting below the underside of the portion of the blade used to shear a tree are the thin washer plates 19 and the heads of bolts 17. Consequently, when a tree-shearing operation is completed and it is desired to maneuver the severed tree in upright position, there is no thick downward-projecting blade-reinforcing part of the blade carrier to catch on the resulting tree stump.

Still another advantage of the blade structure of the present invention is that replacement of a worn blade can be accomplished easily by disconnecting the jack drive pin P' from the blade and unbolting the blade from its blade carrier, without having to disconnect the blade carrier from its mounting to the tractor.

In a representative embodiment of the invention, the blade can be cut from ⅜ inch steel plate and the blade carrier body can be approximately 3 inches thick. Each blade can be about 13 or 14 inches wide and about 26 or 27 inches long. With these dimensions sufficient reinforcement is provided for the blade by the blade carrier that a tree 20 inches in diameter can be sheared without bending or breaking the blade. Each backing plate can be about ¾ inch thick and about 1 inch wide, the applied force backing plate being about 1 inch long and the reaction force backing plate being about 12 inches long. The pivot-reinforcing block should be about the same thickness as the blade carrier to assure a large contact surface area of the bore 9 with its pivot pin P. Each pin P can be about 3 inches in diameter.

I claim:

1. In blade structure for a tree shear including a shear blade having a cutting edge, a blade carrier for carrying and reinforcing the blade, means for detachably mounting the blade on the blade carrier and power drive means for moving the blade to shear a tree, the improvement comprising means for connecting the blade directly to the power drive means independently of the blade carrier.

2. In the blade structure defined in claim 1, the blade carrier including a projecting reaction force backing plate abuttable generally by the edge of the blade opposite its cutting edge for transmitting force from the blade to the blade carrier.

3. In the blade structure defined in claim 1, the blade mounting means mounting the blade on the blade carrier with the blade cutting edge positioned at one side of the blade carrier, the blade having a portion projecting beyond generally the opposite side of the blade carrier and constituting the connecting means.

4. In the blade structure defined in claim 3, the blade projecting portion having an aperture for connection of such blade projecting portion to the power drive means.

5. In blade structure for a tree shear including a shear blade having a cutting edge at one side and a straight edge at generally the opposite side, a blade carrier for carrying and reinforcing the blade, means for detachably mounting the blade on the blade carrier and power drive means for moving the blade to shear a tree, the improvement comprising the blade carrier including a projecting reaction force backing plate having a straight edge substantially contiguously engageable with the straight edge of the blade opposite its cutting edge for transmitting force from the blade to the blade carrier.

6. In the blade structure defined in claim 1, 2, 3, 4 or 5, the blade carrier including a projecting applied force backing plate abuttable generally by the blade cutting edge for transmitting force from the blade to the blade carrier.

7. In blade structure for a tree shear including a shear blade having a cutting edge, a blade carrier for carrying and reinforcing the blade, means for detachably mounting the blade on the blade carrier and power drive means for moving the blade to shear a tree, the improvement comprising the blade carrier including a projecting applied force backing plate abuttable generally by the blade cutting edge for transmitting force from the blade to the blade carrier.

8. In the blade structure defined in claim 7, the blade cutting edge having a notch receiving the applied force backing plate.

9. Blade structure for a tree shear including a blade having a cutting edge, an elongated blade-reinforcing carrier for the blade and power drive means for moving the blade to shear a tree, such blade structure comprising means for detachably mounting the blade on the blade carrier with the cutting edge positioned at one side of the blade carrier, the blade, when mounted on the blade carrier, having a portion projecting beyond generally the opposite side of the blade carrier connectable directly to the power drive means independently of the blade carrier.

10. The blade structure defined in claim 9, in which the blade projecting portion has an aperture for connection of such blade projecting portion to the power drive means.

11. Blade-reinforcing structure for a tree shear including a blade having a cutting edge at one of its sides and power drive means for moving the blade to shear a tree, such blade-reinforcing structure comprising a blade-reinforcing carrier for the blade, said carrier including means for detachably connecting said carrier to the blade and having a projecting applied force backing plate abuttable by the cutting edge of the blade for transmitting force from the blade to the blade carrier.

12. The blade-reinforcing structure defined in claim 11, in which the carrier has a projecting reaction force backing plate abuttable by the edge of the blade opposite the cutting edge for transmitting force from the blade to the blade carrier.

13. Blade-reinforcing structure for a tree shear including a blade having a cutting edge at one side and a straight edge at generally the opposite side and power drive means for moving the blade to shear a tree, such blade-reinforcing structure comprising a blade-reinforcing carrier for the blade, said carrier including means for detachably connecting said carrier to the blade and having a projecting reaction force backing plate having a straight edge substantially contiguously engageable with the straight edge of the blade opposite its cutting edge for transmitting force from the blade to the blade carrier.

14. A blade for a tree shear of the type including power drive means for moving the blade to shear a tree and a blade-reinforcing blade carrier for carrying the blade and swingable therewith, said blade being of substantially uniform thickness and having a cutting edge, said blade being adapted to be detachably mounted on the blade carrier and including a portion located and adapted for connection directly to the tree shear power means independently of the tree shear blade carrier.

15. A blade for a tree shear of the type including power drive means for moving the blade to shear a tree and a blade-reinforcing blade carrier for carrying the blade and swingable therewith which blade carrier has a projecting reaction force backing plate forming a straight blade-backing edge, said blade having a cutting edge and being adapted to be detachably mounted on the blade carrier with the edge of said blade generally opposite its cutting edge in substantially contiguous engagement with the blade-backing edge of the backing plate for transmission of force from the blade to the blade carrier.

16. A blade for a tree shear of the type including power drive means for moving the blade to shear a tree and a blade-reinforcing blade carrier for carrying the blade and swingable therewith which blade carrier has a projecting applied force backing plate, said blade having a cutting edge at one of its sides and being adapted to be detachably mounted on the blade carrier with generally the cutting edge side of the blade abutting the applied force backing plate of the blade carrier for transmission of force from the blade to the blade carrier.

17. The blade defined in claim 16, in which the cutting edge side of the blade has a notch for receiving the applied force backing plate of the blade carrier.

\* \* \* \* \*

UNITED STATES PATENT AND TRADEMARK OFFICE
CERTIFICATE OF CORRECTION

PATENT NO. : 4,274,457
DATED : June 23, 1981
INVENTOR(S) : Christopher Nilsen

It is certified that error appears in the above-identified patent and that said Letters Patent are hereby corrected as shown below:

Title page, [76], cancel "1101 W. Birch St., Shelton, Wash. 98584" and insert ...P. O. Box 10927, Eugene, Oregon 97440...

Signed and Sealed this

First Day of June 1982

[SEAL]

Attest:

GERALD J. MOSSINGHOFF

Attesting Officer

Commissioner of Patents and Trademarks